UNITED STATES PATENT OFFICE.

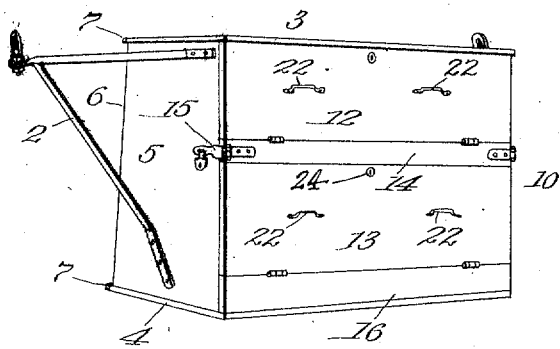
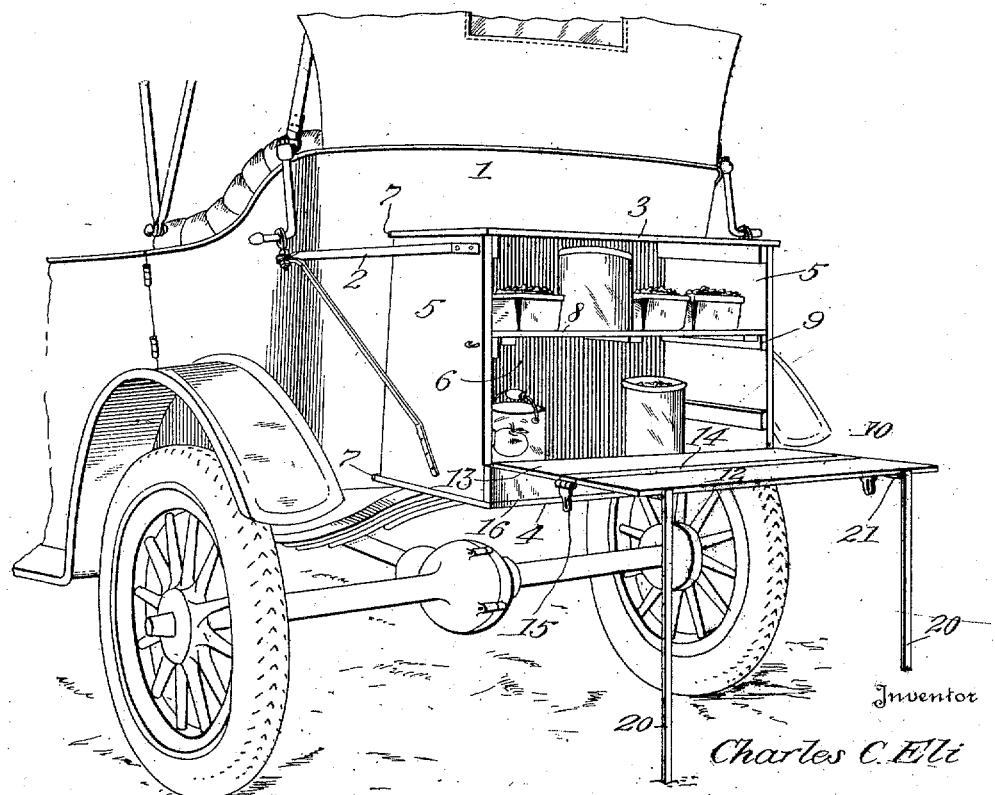

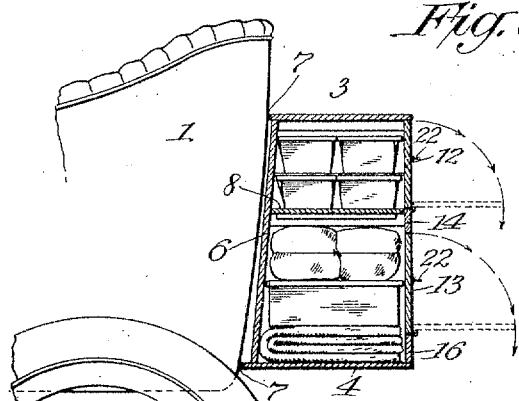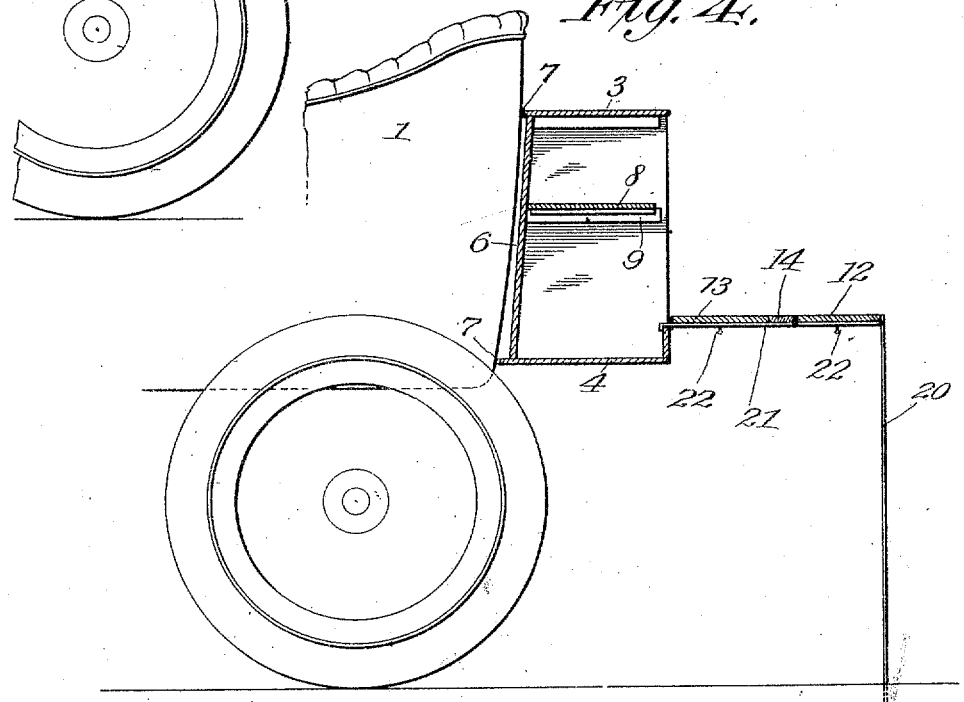

CHARLES C. ELI, OF WEST HOBOKEN, NEW JERSEY.

CARRYALL FOR AUTOMOBILES.

1,259,381.  Specification of Letters Patent.  Patented Mar. 12, 1918.

Application filed August 20, 1917. Serial No. 187,172.

*To all whom it may concern:*

Be it known that I, CHARLES C. ELI, a citizen of the United States, residing at West Hoboken, in the county of Hudson and State of New Jersey, have invented certain new and useful Improvements in Carryalls for Automobiles, of which the following is a specification.

My invention relates to luggage carriers of the type adapted for attachment on the rear of automobiles, and the primary object of my invention is to provide a simple and highly efficient device of this character which shall be easily accessible when the top of the automobile is folded as well as when in sheltering position.

A further object of the invention is to so construct the carrier or carryall that portions thereof may be advantageously used to form a table.

In the drawings,

Figure 1 is a view in perspective of my improved carryall with its supporting brackets.

Fig. 2 shows in perspective the rear of an automobile with the carryall attached, the front being lowered to form a table.

Fig. 3 is a sectional view, the back being in closed position, the arrows and dotted lines indicating the manner of opening portions of the back.

Fig. 4 is a sectional view showing the front thrown wide open.

Referring to the drawings, 1 designates an automobile to the rear of which are secured brackets 2 which form a support for my improved carryall. The latter is shown as comprising horizontally disposed top and bottom members 3 and 4, sides 5, and a back 6. The longitudinal edges of the top and bottom members adjacent the automobile are provided with strips 7 of felt or other scratch-preventing material. The interior of the carryall may be divided into a number of compartments to receive food and luggage or other articles. For this purpose I preferably employ shelves 8, supported at their ends by strips 9 secured to the sides 5. If desired the shelving may be omitted so as to have but a single compartment.

The carryall is closed by a front 10 including upper and lower hinged doors 12 and 13, the door 12 turning on hinges supported by a cross-strip 14 which is detachably secured to the carryall by a hasp 15 located at each end of the strip, the hasp being locked to the sides of the carryall in any preferred way. The door 12 and strip 14 may, if desired, be opened laterally by releasing one hasp 15 and permitting the strip 14 to pivot vertically on the other hasp. The lower door 13 is hingedly connected to a permanent cross-strip 16. Obviously by this construction access may be had to the upper compartment by turning the door 12 on its hinges without the necessity of opening the lower compartment. Further it is to be noted that access may readily be had to the entire area of the carryall by disconnecting the strip-retaining hasps 15 from the sides and removing the strip 14 which will carry with it the door 12 and by turning the door 13 on its pivot. Any suitable lock 24 may be provided whereby a rigid connection may be had between the door 13 and the strip 14 when it is desired to open both the doors together. In Fig. 2 I have shown the doors 12 and 13 and the strip 14 opened to form a table, supporting legs 20 maintaining the parts at an appropriate level. When so used arms 21 of the legs 20 may be passed through cleats 22 on the doors so as to firmly hold these parts, the cleats serving the purpose of handles in the normal use of the doors.

The advantages of my invention will be apparent. It is manifest that my improved carryall is readily attached for carrying baskets or bundles or camping outfits and that by the use of the particular form of closure access into one part of the carryall may be had without interfering with the other compartments.

I claim as my invention:

1. In a carryall for automobiles adapted to be divided into compartments, a closure including a plurality of doors, a strip, a hasp at either end of said strip for detachably securing it to said carryall, one of said doors being hinged to a fixed part of the carryall and the other having hinged engagement with said detachable strip to permit access to be separately had to the several compartments.

2. In a carryall for automobiles adapted to be divided into compartments, a closure including a plurality of doors, a horizontal strip adapted to be detachably secured to said carryall by means of hasps, the lower of said doors being hinged horizontally to a fixed part of the carryall and the other having hinged engagement with said detachable strip, and supporting members adapted to be secured to said doors to convert said doors and detachable strip into a table when turned on the hinges of the door secured to the fixed part of the carryall.

3. In a carryall for automobiles adapted to be divided into compartments, a closure including a plurality of doors, a detachable strip provided with hasps for securing it to a fixed part of the carryall, one of said doors being hinged to said strip and the other of said doors being hinged to a fixed portion of the carryall, and a lock member for detachably connecting the second door with the detachable strip whereby both of said doors may be opened as an entirety.

In testimony whereof, I have hereunto subscribed my name.

CHARLES C. ELI.